Figure 3:
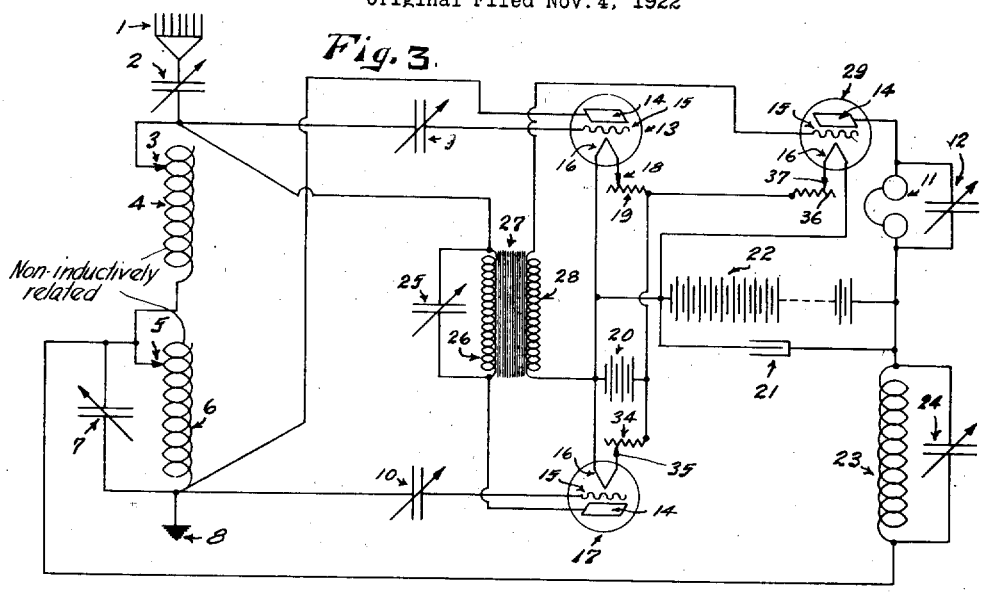

Nov. 29, 1927. Re. 16,805
F. G. SIMPSON
RADIO TELEGRAPH AND TELEPHONE RECEIVING SYSTEM
Original Filed Nov. 4, 1922 2 Sheets-Sheet 1
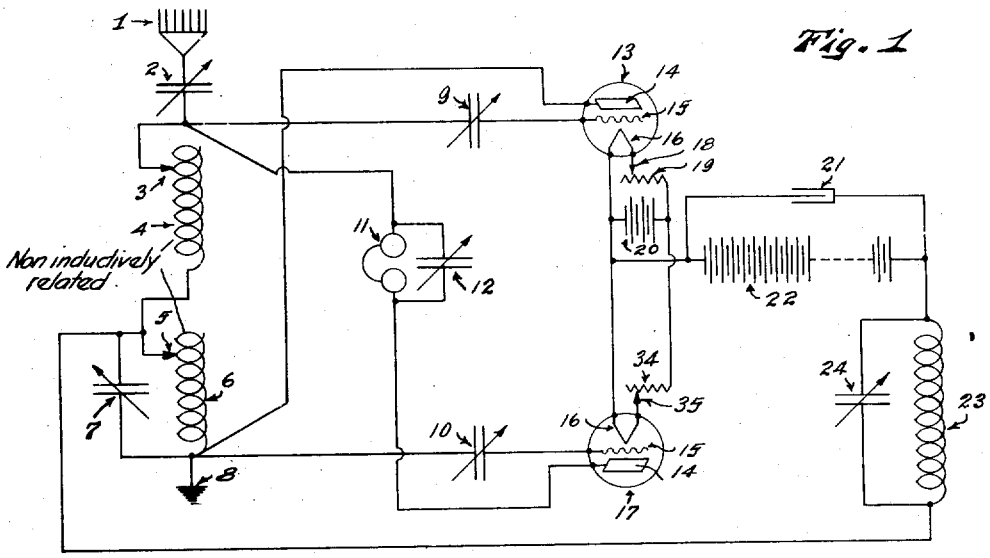
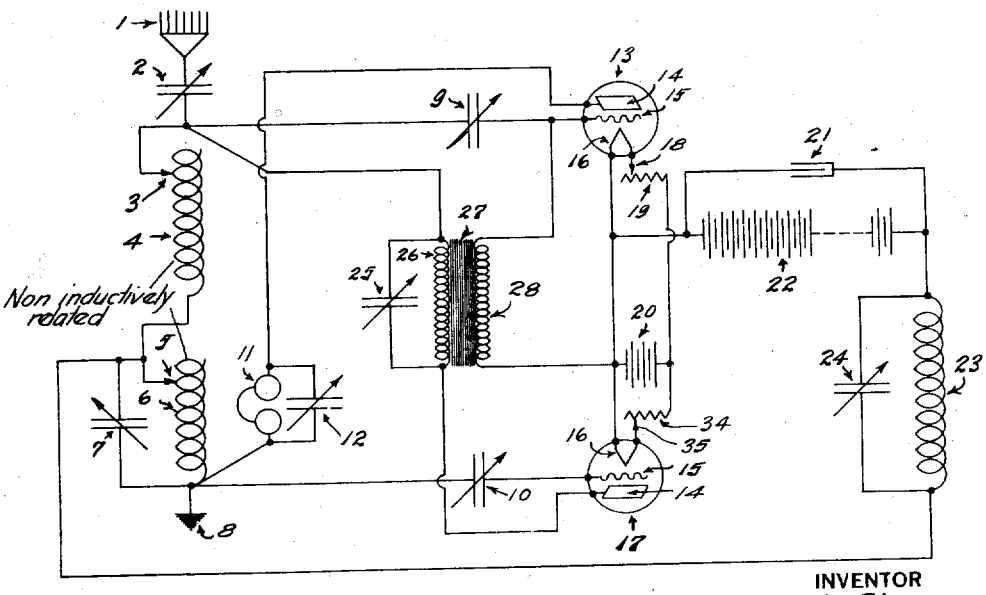
Fig. 2
INVENTOR
Frederick Grant Simpson
BY
Fred G. Matheny
ATTORNEY Nov. 29, 1927.

Re. 16,805

F. G. SIMPSON

RADIO TELEGRAPH AND TELEPHONE RECEIVING SYSTEM

Original Filed Nov. 4, 1922

2 Sheets-Sheet 2

INVENTOR

Frederick Grant Simpson

BY

Fred G. Matheny

ATTORNEY

Reissued Nov. 29, 1927. Re. 16,805

UNITED STATES PATENT OFFICE.

FREDERICK GRANT SIMPSON, OF SEATTLE, WASHINGTON, ASSIGNOR TO SIMPSON RADIO CORPORATION, OF SEATTLE, WASHINGTON, A CORPORATION OF WASHINGTON.

RADIO TELEGRAPH AND TELEPHONE RECEIVING SYSTEM.

Original No. 1,507,689, dated September 9, 1924, Serial No. 598,976, filed November 4, 1922. Application for reissue filed September 7, 1926. Serial No. 134,116.

This invention relates to improvements in the arrangement and connections of electrical apparatus at the receiving station of a radio communication system; the object being to detect, and amplify the effect of received electro-magnetic waves and to reproduce the signals carried by or the modulations in, such electro-magnetic waves by means of similar variations in the electrical current in a circuit or in the differences of electrical potential between parts of such circuit, which is supplied by a local battery or other generator of electrical current in a manner to make them more perceptible and intelligible. The invention also embodies an improved method of accomplishing the results mentioned. To this end I have modified and improved upon previously known arrangements of receiving circuits in a manner which will be clearly understood from the following description in connection with the accompanying drawings.

It is to be noted that I have included in my improved arrangement of circuits certain known circuits and combinations of electrical apparatus, in an elementary way, to the extent that there is comprised therein, together with other known elementary circuits, a circuit having as an essential part, two three electrode electron tubes commonly known as "audions," "triodes," etc., (or their equivalent one five electrode electron tube) which circuit has been described by W. H. Eccles and F. W. Jordan in British Patents 148,582 and 149,018, dated February 16, 1920. It also embodies an inductance and capacitance, in parallel, connected in series with the local generator of electric current, which has been shown by E. H. Armstrong, in United States Patent 1,113,149 of Oct. 6, 1914. I depart, however, from the customary use of all these known circuits by combining them together, adjusting their constants and associating them with other electrical apparatus in a manner which produces enormous amplification in the effect of the received electromagnetic waves upon the current, or electrical potentials, supplied by the local generator, thereby causing the signals carried by, or the modulations in, such electromagnetic waves to be reproduced in greatly amplified form by a telephone receiver, or other current or potential actuated device, as will be understood from the following description.

In this description I shall designate as triodes, three electrode electron tubes each embodying an evacuated vessel containing a hot cathode, an anode in the form of a plate or concentric cylinder and another electrode placed in a position, with respect to the cathode and anode, such that variations in its electrical potential with respect to either of the other two electrodes will cause like variations in the electrical current between them. I shall designate the anode of each triode as the "plate"; the cathode as the "filament" and the third electrode as the "grid."

Figure 4:
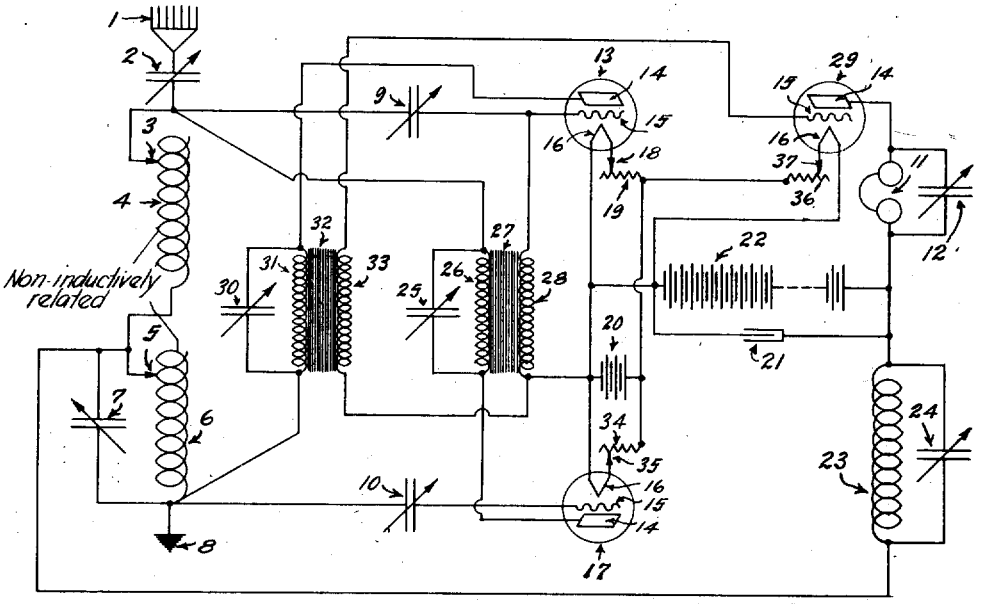

In the drawings Figure 1 illustrates, diagrammatically, a simple form of my arrangement of the receiving circuit and electrical apparatus at a radio communication station. Figure 2 represents a similar arrangement with the addition of a transformer for the passage of audio frequency currents and the impressing of audio frequency potentials between the grid and filament of one of the triodes. Figure 3 shows an arrangement like that of Figure 2 except that I have provided a third triode and have connected the secondary terminals of the audio frequency transformer to its grid and filament. I have also removed the telephone receiver, or other proper receiving device, from its previous position to one in series with the plate of the third triode. Figure 4 embodies a combination of Figures 2 and 3. In this figure I have included two audio frequency transformers, the secondary terminals of one of them being connected to the grid and filament of a triode as shown in Figure 2 and the secondary terminals of the other transformer being connected to the grid and filament of the third triode as shown in Figure 3.

Like reference numerals designate like parts throughout the several views.

Referring particularly to Fig. 1, 1 represents the ordinary elevated part of an antenna, at a radio receiving station, which is electrically connected in series in the order given, with a variable condenser 2, the switch 3, inductance coil 4, switch 5, inductance coil 6, to the ground or counterpoise 8; a variable condenser 7 is connected in parallel with the active part of the inductance coil 6 and provides an alternative branch of the antenna circuit between the switch 5 and the ground 8. The switches 3 and 5 are preferably mechanically actuated by a control member common to both of them and so adjusted that the active part of each of the coils 4 and 6 shall be of equal inductance. A variable condenser 9 is electrically connected in series between the switch 3 and the grid 15 of a triode 13. A variable condenser 10 is electrically connected in series between the ground, or counterpoise 8 and the grid 15 of a triode 17. The plate 14 of the triode 13 is electrically connected to the ground, or counterpoise 8. 11 represents a telephone receiver, or other current or potential actuated device capable of reproducing variations in the force which actuates it in a manner to make them perceptible or intelligible. In the following description I shall refer to 11 as the "telephone" although it should be understood that this designation embraces any device of the kind mentioned. The telephone 11 is electrically connected in series between the switch 3 and the plate 14 of the triode 17. A variable condenser 12 is connected in parallel with the telephone 11 thereby providing a path for radio frequence current from the switch 3 to the plate 14 of triode 17. The filament 16 of triode 13 has one of its terminals electrically connected to the negative terminal of a battery, or other source of electrical current, 20; its other terminal is connected through a switch 18 and a current controlling rheostat 19 to the positive terminal of battery 20. The filament 16 of the triode 17 has one of its terminals electrially connected to the negative terminal of the battery 20; its other terminal is connected through a switch 35 and a current controlling rheostat 34 to the positive terminal of the battery 20. Another battery, or other source of electric current 22, has its negative terminal electrically connected to the negative terminal of the battery 20. An inductance coil 23 is electrically connected in series, between the positive terminal of the battery 22 and the switch 5. A condenser 21 is connected in parallel with the battery 22. A variable condenser 24 is connected in parallel with the inductance coil 23. Condensers 21 and 24 provide a path for radio frequency currents from the switch 5 to the filament 16, of triode 13, and to the filament 16, of the triode 17.

I shall hereinafter refer to the circuit which consists of the aerial antenna structure 1, the condenser 2, switch 3 inductance coil 4, switch 5, inductance coil 6 and condenser 7 in parallel, and ground or counterpoise 8, as the "oscillatory circuit". This oscillatory circuit constitutes a well known type of receiving antenna circuit at a radio station.

In the operation of this arrangement of circuits and apparatus the rheostats 19 and 34 should be adjusted, by means of the switches 18 and 35 respectively, to establish a current in each of the filaments 16 of the triodes 13 and 17 just sufficient to fix the temperature of the filaments at a value, largely established by the structural parameters of the triodes, suitable for the best operation of the telephone 11, and dependent upon the kind of signal or current modulation involved in such operation. The voltage of the battery 22 should also be adjusted to the same end. For all kinds of signals or modulations in the received electromagnetic waves, the oscillatory circuit should be so adjusted, by means of the variable condensers 2 and 7, or by means of the switches 3 and 5, as to be resonant at the frequency of the received waves. The adjustment of the condensers 9, 10 and 12 is not critical if the adjustments of filament temperature, voltage of battery 22 and condenser 24 are properly made. I have found it possible to substitute fixed condensers of approximately 0.001 micro-farads capacitance for the variable condensers 9, 10 and 12 shown in the drawings. The adjustment of the condenser 24 is dependent upon the kind of signal received as will be hereinafter explained. The capacitance of the fixed condenser 21 may be established within a comparatively wide range; I have found a value of 0.5 micro-farads to be entirely satisfactory for all usual purposes. While the inductance of the coil 23 may also be established at any value within a wide range I have been able to secure entirely satisfactory results with a coil having an inductance value of 14 millihenrys, direct current resistance of 10 ohms and negligible capacitance, when connected, as shown by the drawing, in parallel with a variable condenser 24 having a maximum capacitance of 0.005 micro-farads.

If the triodes 13 and 17 are structurally identical and if their filaments have the same temperature the active parts of the coils 4 and 6 having the same resistance, and the capacitance of condensers 9 and 10 being equal to each other, a current will be established from the positive terminal of the battery 22, which current may be considered as divided into two principal components, both existing in the coil 23 but separating at the switch 5. The larger of these currents, finds a circuit from the switch 5 through the coil 6 to plate 14, of triode 13, thence by means of the electronic conductivity of the triode, to its filament 16, and to the negative terminal of the battery 22. The smaller current finds its circuit from the switch 5, through the coil 4, switch 3 and telephone 11, to the plate 14, of triode 17 thence, by means of the electronic conductivity of such triode to its filament 16 and to the negative terminal of the battery 22. That this is the smaller of the two principal current components is due to the added resistance of the telephone 11 in its circuit. It will be seen from the drawings and the previous description thereof, that an electrical potential, positive to that of the filaments of the triodes, is impressed by the battery 22 by way of the coil 23, switch 5 and coil 6 upon that conductor of condenser 10 which is connected to the ground, or counterpoise, 8; there is therefore by means of the electrostatic induction of condenser 10, a potential negative with respect to the filaments of the triodes, impressed upon the grid 15 of the triode 17. In a like manner a positive potential is impressed by the battery 22, by way of the coil 23, coil 4, and switch 3, upon that conductor of condenser 9 which is connected to switch 3; there is therefore by means of the electro-static induction of condenser 9, a potential, negative with respect to the filaments of the triodes, impressed upon the grid 15 of the triode 13. In general these negative grid potentials will be unequal, due to the unequal distribution of current between the coils 4 and 6 and the consequent unequal drop in electrical potential between the switch 5 and the terminals of these coils which are adjacent to condensers 9 and 10 respectively. It is well known that an increase of negative potential, with respect to the filament, of a triode effects a decrease in the current between the plate and the filament of such triode. In the present instance the negative potential of the grid 15, of the triode 17, is somewhat less, with respect to the filaments of the triodes, than is that of the grid 15 of the triode 13. This is due to the fact that there is a larger current, and consequently a greater drop in potential, in the coil 6 than there is in the coil 4, through which coils the potentials upon the grids of triodes 17 and 13 are respectively impressed. It may readily be seen that this unequality in the grid potentials of the triodes tends to decrease the current between the plate and filament of triode 13 to a greater extent than is the case with respect to the decrease in the current between the plate and filament of the triode 17. The readjustment of current values between the coils 4 and 6 tending to equality and between the triodes 13 and 17 produces electrical oscillations in the oscillatory circuit due to the well known inherent properties of circuits of its kind. An oscillating potential of opposite phase is therefore simultaneously impressed upon the grid 15 of the triodes 13 and 17, respectively causing the triodes to function as electrical valves alternately permitting the establishment of current between their respective plates and filaments, and therefore in the coils 4 and 6, thereby sustaining the electrical oscillations in the oscillatory circuit.

For the correct understanding of the function of this circuit arrangement it should be distinctly noted that coils 4 and 6, while individually forming in all embodiments shown constituent elements of the oscillatory circuit aforementioned, should not be mutually inductively coupled.

In the foregoing I have confined myself to a description of the manner in which sustained oscillations are created in the oscillatory circuit due to an initial unequal distribution of the current between the coils 4 and 6 caused by the added resistance of the telephone 11 in the circuit which includes the plate of the triode 17. It is obvious that any one of many other causes of unequal distribution of current between these coils will have a similar effect, as for example if the filament temperatures are not properly adjusted, as described, or if oscillations are generated in the oscillatory circuit by the introduction of an electromagnetic field, as is the case at a radio receiving station during the passage of electromagnetic waves.

Oscillations will be indefinitely sustained in the oscillatory circuit as hereinabove described, their amplitudes being limited by the saturation characteristics of the triodes, unless the constants of the oscillatory circuit as so modified by the introduction of resistance for example, as to increase the energy losses in that circuit to a greater quantity than the energy supplied by the battery 22. Sustained oscillations may also be prevented by reduction of the filament temperatures of the triodes to a value where the impedance of the triodes between their plates and filaments is sufficiently large to limit the energy supplied by the battery 22, in the form of pulsating current, to a quantity less than that necessary to supply the losses of energy in the oscillatory circuit.

An additional means of either suppressing, or controlling the duration of, oscillations in the oscillatory circuit, is provided by the variable condenser 24, as shown on the drawing and hereinabove described.

The circuit which consists of the condenser 24 and the inductance coil 23 has impressed upon it, between the common terminals of the condenser 24 and the inductance coil 23, an alternating component of electromotive-force, supplied by the battery 22 and its associated circuits, which together with the direct electromotive-force, also supplied by the battery 22, produces in effect, a pulsating current in that part of my arrangement of circuits which consists of the battery 22, inductance coil 23 and condenser 24 in parallel, and the electrical connection to the switch 5. It is well known that if the circuit which consists of the inductance coil 23 and the condenser 24 is adjusted to be resonant at the frequency of this alternating component of electro-motive-force that it will offer maximum impedance to currents of such frequency. In the present instance, I control the duration of oscillations in the oscillatory circuit including inductances 4 and 6 or suppress them, either by adjusting the filament temperatures of the triodes, or, by adjusting the variable condenser 24.

When maximum reinforcement of the oscillations, in the oscillatory circuit, is required, irrespective as to whether such oscillations are to be sustained or not, it is necessary to adjust the constants of the entire circuit which supplies current pulsations from the battery 22 to the switch 5, in a manner which will cause this circuit to be resonant at a frequency which is twice that of the frequency of the oscillations in the oscillatory circuit. This may be readily understood by considering the fact that unidirectional current pulsations must proceed from the switch 5, at each half cycle of an oscillation in the oscillatory circuit, to the oscillatory circuit, in phase with the current pulsation existing at the moment in either coil 4 or coil 6. In other words, each of these uni-directional current impulses must reach its amplitude at that instant of time when each of the triodes, 13 and 17, offers minimum impedance between plates 14 and filaments 16 as governed by the potentials of grids 15 with respect to filaments 16.

When receiving signals, carried by groups of electromagnetic waves, each group consisting of trains of such waves emanating from either a spark of interrupted continuous wave telegraph transmitting station; or when receiving telephone modulations in a continuous stream of waves, I prefer to adjust the filament temperature of the triodes 13 and 17 at a value slightly lower than that necessary to permit sustained oscillations in the oscillatory circuit; after which I adjust the variable condenser 24 so that the entire circuit supplying energy from the local battery 22 shall be resonant at twice the frequency of the current generated in the oscillatory circuit by the incoming electromagnetic waves. When receiving signals carried by a continuous stream of waves emanating from a telegraph transmitting station, I prefer to adjust the filament temperature of the triodes at a value which will permit the existence of sustained oscillations in the oscillatory circuit; after which I adjust the variable condenser 24 so that the entire circuit supplying energy from the battery 22 shall be resonant at a frequency either slightly more or less than twice the frequency of the current generated in the oscillatory circuit by the incoming waves. In this case the combined effect of two frequencies upon the current in the telephone 11 produces an audible "beat" frequency as is the case in the well known heterodyne receiving apparatus. In the other cases mentioned signals are reproduced in the telephone 11, by the audio frequency interruptions in the continuity of, or audio frequency modulations in the amplitude or length of, the incoming electromagnetic waves, through the medium of the currents generated by them in the oscillatory circuit and the indirect effect of such currents upon conductivity of the triodes, as is well known. In each of the cases mentioned it is to be understood that the oscillatory circuit is adjusted to be resonant at the frequency of the incoming waves, in the manner hereinabove described.

Referring to Figure 2,—11 represents a telephone, shunted by the variable condenser 12, and connected in series between the ground, or counterpoise, 8, and the plate 14, of the triode 13. 27 represents the iron core of an audio frequency transformer, having a primary coil 26, shunted by the variable condenser 25, connected in series between the switch 3 and plate 14, of triode 17, and a secondary coil 28, the terminals of which are connected to the grid 15 and the filament 16, respectively, of the triode 13. I have found it to be entirely satisfactory to substitute a fixed condenser having a capacitance of approximately 0.001 micro-farads for the variable condenser 25. The purpose of condenser 25 is to afford a path for radio frequency pulsations to the plate 14 of triode 17. Condenser 12 affords a path for radio frequency pulsations to the plate 14, of triode 13. Audio frequency potentials, corresponding to the audio frequencies of the signals, beats, or modulations involved are impressed upon the grid and filament of triode 13 by means of the inductive association of primary coil 26 with secondary coil 28, thereby superimposing audio frequency variations in the potential of the grid with respect to the filament of triode 13. These variations in electrical potential produce like variations in the current between the plate 14 and the filament 16, of triode 13, and therefore in the current in the telephone 11, greatly amplifying the effect of the received signals, or modulations, upon the telephone. In other respects the arrangement shown in Fig. 2 is the same as that shown by, and described in connection with Fig. 1. It is to be noted that the audio frequency pulsations in the current generated by the battery 22 constitute an alternating current component, of audio frequency, of the current supplied by the battery, to which the circuits in which it exists are not resonant.

In Fig. 3 the plate 14 of triode 13 is connected to the ground, or counterpoise 8, in the same manner as shown in Fig. 1. The terminals of the secondary coil 28 are connected to the grid 15 and the filament 16 respectively, of a third triode 29, having a plate 14. The telephone 11, shunted by the condenser 12, is connected in series between the plate 14, of the triode 29, and the positive terminal of the battery 22. One terminal of the filament 16, of triode 29, is connected to the negative terminal of battery 20. The other terminal of the filament 16, of triode 29, is connected by means of switch 37 and current controlling rheostat 36, to the positive terminal of battery 20. The arrangement shown in Fig. 3 functions in every respect the same as that shown in Fig. 1 except that the audio frequency pulsations in the form of potential variations are conveyed by means of the primary and secondary coils 26 and 28 to the grid and filament of a third, or amplifying triode 29, thereby producing like variations in the current between the plate and filament of the amplifying triode, and therefore in the current in the telephone 11. This method of audio frequency amplification is well known in the manner of its application to other systems, of radio reception.

In Fig. 4 the secondary coil 28 has its terminals connected to the grid and filament of the triode 13, as is the case in Fig. 2. An audio frequency transformer, having an iron core 32, has its primary coil 31, shunted by the variable condenser 30, connected in series between the ground or counter-poise 8, and the plate 14 of triode 13, the terminals of the secondary coil 33 are connected to the grid 15, and filament 16, respectively, of the triode 29, which is otherwise connected to, and associated with, the other parts of this arrangement of circuits, the same as has been shown, and described in connection with Fig. 3. The variable condenser 30 may be replaced by a fixed condenser of approximately 0.001 micro-farads capacitance. Audio frequency pulsations of great amplitude are present in the current in the primary coil 31 for the same reason as that explained in connection with the current in the telephone 11 as shown in Fig. 2. These audio frequency current pulsations are conveyed in the form of potential variations, by the secondary coil 33 to the grid and filament of the triode 29, and are therefore reproduced, in still greater amplified form, in the current in the telephone 11.

While I have shown various forms and kinds of apparatus as included in the elementary parts of my arrangement of circuits, I do not desire to be limited, or restricted, in the broad scope of my invention, as defined in the claims, to any specific structure of apparatus or its arrangement in elementary circuits, the assemblage of which forms the means of accomplishing the purposes hereinabove stated in substantially the manner herein described. It is obvious that many modifications, or changes, in the shape, kind and arrangement of the various parts may be made without departing from the broad scope of the appended claims. As an example, it is clear that the action herein described may be obtained by substituting one electron tube having a single filament, two grids and two plates for the triodes 13 and 17. It may also be seen that other electric valves operating in a manner similar to the triodes described may be used. It is further apparent that changes may be made in the oscillatory circuit as for example, by coupling the antenna circuit to a tuned secondary circuit containing the coils 4 and 6, in any of several well known ways. It may also be used for detecting and amplifying, weak electric currents produced at sources other than that described herein.

Having set forth the object and nature of my invention, and various means and arrangements of accomplishing the purpose thereof, what I claim as new and useful, and of my own invention, and desire to secure by Letters Patent, is:—

1. Radio receiving apparatus embodying an oscillatory antenna circuit, an electric current generator, circuit means connecting said generator with said oscillatory antenna circuit, two electric valves interposed in said circuit means and arranged to permit said generator to supply uni-directional current impulses to said oscillatory antenna circuit, the circuit including said generator being adjusted to be resonant at substantially twice the frequency of said oscillatory antenna circuit.

2. Radio receiving apparatus embodying an oscillatory circuit adjusted to be resonant at the frequency of incoming electromagnetic waves, a generator of electric current, circuit means connecting said generator with said oscillatory circuit, two electric valves interposed in the circuit including said generator and arranged to be operated by the electric potentials generated in said oscillatory circuit to permit said generator to supply electrical energy to said oscillatory circuit, the circuit including said generator being adjusted to be resonant at substantially twice the frequency of the oscillations in said oscillatory circuit.

3. At a radio receiving station, an oscillatory circuit adjusted to be resonant at the frequency of incoming electromagnetic waves, a generator of electric current, connected to, and associated with, said oscillatory circuit by means including two electric valves arranged to be operated by the electric potentials generated in said oscillatory circuit in a manner to permit said generator of electric current to supply uni-directional current impulses to said oscillatory circuit, said uni-directional current impulses comprising direct and alternating current components, said alternating current components having twice the frequency of the resonant current in said oscillatory circuit; and means for adjusting the circuit comprising said generator of electric current, and its connections to and with said oscillatory circuit, to be resonant at the frequency of said alternating current component.

4. The method of reinforcing an electric action or stimulus in a radio receiving set embodying an oscillatory antenna circuit which is connected with an electric current generator by circuit means including two electric valves arranged to permit said current generator to supply current impulses to said oscillating antenna circuit, which consists in part in adjusting the circuit including said generator to be resonant at substantially twice the frequency of the oscillatory antenna circuit.

5. Radio receiving apparatus embodying an oscillatory circuit adjusted to be resonant at the frequency of incoming electromagnetic waves, an electric current generator, circuit means connecting said generator with said oscillatory circuit, two electric valves interposed in the circuit including said generator and arranged to permit said generator to supply current impulses to said oscillatory circuit, and means including inductance and capacitance, in parallel, connected in series between said electric current generator and said oscillatory circuit for adjusting the circuit including said generator to be resonant at twice the frequency of said oscillatory circuit.

6. Radio receiving apparatus embodying an oscillatory circuit adjusted to be resonant at the frequency of incoming electromagnetic waves, two three electrode electron tubes each having their anode and their third electrode connected with said oscillatory circuit, an electric current generator connected with the cathodes of said electrone tubes and with said oscillatory circuit and means for adjusting the circuit including said generator to be resonant at twice the frequency of said oscillatory circuit.

7. Radio receiving apparatus embodying an oscillatory circuit adjusted to be resonant at the frequency of incoming electromagnetic waves, two electric triodes each having their anode and grid connected with said oscillatory circuit, condensers interposed in said grid connections, a telephone receiver interposed in one of said anode connections, an electric current generator interposed between said oscillatory circuit and the cathodes of said triodes, and means for adjusting the frequency of the circuit including said generator to be resonant at twice the frequency of said oscillatory circuit.

8. At a radio receiving station, an oscillatory circuit adjusted to be resonant at the frequency of incoming electromagnetic waves; a generator of electric current connected to, and associated with, said oscillatory circuit by means including two electric valves arranged to be operated by the electric potentials generated in said oscillatory circuit in a manner to permit said generator of electric current to supply uni-directional current impulses to said oscillatory circuit, said uni-directional current impulses comprising direct and alternating current components, said alternating current component having twice the frequency of the resonant current in said oscillatory circuit; means for adjusting the circuit comprising said generator of electric current, and its connections to, and with, said oscillatory circuit, to be resonant at the frequency of said alternating current component; and means for impressing electric potentials generated by variations in the current in one of the said electric valves upon the actuating members of the other one of said electric valves.

9. Radio receiving apparatus embodying an oscillatory circuit adjusted to be resonant at the frequency of incoming electromagnetic waves, a generator of electric current, circuit means connecting said generator with said oscillatory circuit, two electric valves interposed in the circuit including said generator and arranged to permit said generator to supply uni-directional current impulses to said oscillatory circuit, the circuit including said generator being adjusted to be resonant at twice the frequency of said oscillatory circuit and means for impressing electric potentials generated by variations in the current in one of said electric valves upon the actuating members of the other of said electric valves.

10. Radio receiving apparatus embodying an oscillatory circuit adjusted to be resonant at the frequency of incoming electromagnetic waves, an electric current generator connected to and associated with, said oscillatory circuit, two electric valves interposed in the circuit including said generator and arranged to be operated by the electric potentials generated in said oscillatory circuit to permit said generator to supply uni-directional current impulses to said oscillatory circuit, said current impulses comprising direct and alternating current components, said alternating current component having twice the frequency of the resonant current in said oscillatory circuit, means including inductance and capacitance, in parallel, connected in series between said electric current generator and said oscillatory circuit for adjusting the circuit including said generator to be resonant at the frequency of said alternating current component and a transformer connected with said electric valves for impressing electric potentials generated by variations in the current in one of said electric valves upon the actuating members of the other of said electric valves.

11. At a radio receiving station, an oscillatory circuit adjusted to be resonant at the frequency of incoming electromagnetic waves, a generator of electric current, connected to, and associated with said oscillatory circuit by means including two electric valves arranged to be operated by the electric potentials generated in said oscillatory circuit in a manner to permit said generator of electric current to supply uni-directional current impulses to said oscillatory circuit, said uni-directional current impulses comprising direct and alternating current components, said alternating current component having twice the frequency of the resonant current in said oscillatory circuit; means for adjusting the circuit comprising said generator of electric current, and its connections to, and with, said oscillatory circuit, to be resonant at the frequency of said alternating current component; a third electric valve arranged to control the current in a separate circuit, supplied by said generator of electric current, and arranged to be operated by electric potentials generated by variations in the current in one of aforesaid electric valves; and means for impressing said electric potentials upon the actuating members of said third electric valve.

12. Radio receiving apparatus embodying an oscillatory circuit adjusted to be resonant at the frequency of incoming electromagnetic waves, a generator of electric current; circuit means connecting said generator and said oscillatory circuit, two electric valves interposed in the circuit including said generator and its connections with said oscillatory circuit and arranged to permit said generator to supply uni-directional current impulses to said oscillatory circuit, the circuit including said generator being adjusted to be resonant at twice the frequency of said oscillatory circuit, a third electric valve arranged to be operated by electric potentials generated by variations in the current in one of said first named electric valves and to control the current in a separate circuit supplied by said generator and means for impressing said electric potentials upon the actuating members of said third electric valve.

13. Radio receiving apparatus embodying an oscillatory circuit adjusted to be resonant at the frequency of incoming electromagnetic waves, a generator of electric current, circuit means connecting said generator and said oscillatory circuit, two electric valves interposed in the circuit including said generator and its connections with said oscillatory circuit and arranged to permit said generator to supply uni-directional current impulses to said oscillatory circuit, the circuit including said generator being adjusted to be resonant at twice the frequency of said oscillatory circuit, another circuit connected with said generator, a third electric valve interposed in said other circuit and arranged to be operated by electric potentials, generated by variations in the current in one of said first named electric valves, means for impressing said electric potentials upon the actuating members of said third electric valve and means for translating variations of electrical energy in said other circuit into sound.

14. Radio receiving apparatus embodying an oscillatory circuit adjusted to be resonant at the frequency of incoming electromagnetic waves, a generator of electric current; circuit means connecting said generator and said oscillatory circuit, two electric valves interposed in the circuit including said generator and its connections with said oscillatory circuit and arranged to permit said generator to supply uni-directional current impulses to said oscillatory circuit, the circuit including said generator being adjusted to be resonant at twice the frequency of said oscillatory circuit, means for impressing electric potentials generated by variations in the current in one of said electric valves upon the actuating members of the other of said electric valves, another circuit connected with said generator, a third electric valve interposed in said other circuit and arranged to be operated by electric potentials generated by variations in the current in one of said first named electric valves and means for impressing said electric potentials upon the actuating members of said third electric valve.

15. Radio receiving apparatus embodying an oscillatory circuit adjusted to be resonant at the frequency of incoming electromagnetic waves, two electric triode valves each having their anode and their third electrode connected with said oscillatory circuit, condensers interposed in each of said third electrode connections, transformers each having their primary coils interposed in the respective connections to said two anodes, the secondary coil of one of said transformers being connected to the third electrode and the cathode of one of said electric triode valves, an electric current generator connected with said oscillatory circuit and the cathodes of said electric valves, inductance and capacitance in parallel connected in series between said generator and said oscillatory circuit, a third electric triode valve having its third electrode and cathode connected with the secondary coil of the other transformer, and a telephone receiver connected between said generator and the anode of said third electric valve.

16. The method of amplifying an alternating electric current which consists in reinforcing each half cycle of such alternating electric current by a pulse of uni-directional current, successive pulses of said uni-directional current being uniformly in the same direction.

17. A radio receiving apparatus, embodying an oscillatory antenna circuit, a direct current generator, circuit means connecting said generator with said oscillatory circuit, two electric valves interposed in said circuit means and arranged to permit said generator to supply uni-directional current impulses to said oscillatory circuit in phase with the oscillations in said circuit.

18. An oscillation system comprising a source of direct current, an oscillatory circuit having a pair of inductance elements electrically connected together at one end in substantially non-inductive relation to each other and having a capacity element interposed between them at the other end, and control means for admitting direct current impulses from said source separately through the respective inductance elements at alternate moments of time and in phase with an oscillation current flowing in the oscillatory circuit.

19. An oscillation system comprising a source of direct current, an oscillatory circuit having a pair of inductance elements connected together at one end in substantially non-inductive relation to each other and having a capacity element interposed between them at the other end, a connection from the positive pole of said source of direct current to said inductance elements at the end at which they are connected together, and control means for admitting direct current impulses from said source separately through the respective inductance elements at alternate moments of time but always in the same direction and in phase with an oscillation current flowing in the oscillatory circuit.

20. An oscillation system comprising a source of direct current, an oscillatory circuit having a pair of inductance elements electrically connected together at one end in substantially non-inductive relation to each other and having a capacity element interposed between them at the other end, and means actuated by an oscillation current in said oscillation circuit for admitting direct current impulses from said source separately through the respective inductance elements at alternate moments of time but always in the same direction and in phase with the oscillation current.

21. An oscillation system comprising in combination a source of direct current, an oscillatory circuit having a pair of inductance elements electrically connected together at one end in substantially non-inductive relation to each other and having a capacity element interposed between them at the other end, and control means for admitting direct current impulses from said source through one of said inductance elements at recurrent moments of time but always in the same direction and in phase with an oscillation current flowing in the oscillatory circuit.

22. An oscillation system comprising in combination a source of direct current, an oscillatory circuit having a pair of inductance elements electrically connected together at one end in substantially non-inductive relation to each other and having a capacity element interposed between them at the other end, a triode tube having its cathode circuit connected to the negative pole of said direct current source, a connection from the positive pole of said direct current source to the said inductance elements at the end at which they are connected together, a connection from the opposite end of one of said inductance elements to the anode of said triode tube, and a capacity connection from the opposite end of the other of said inductance elements to the grid electrode of said triode tube.

FREDERICK GRANT SIMPSON.